Figure 1:
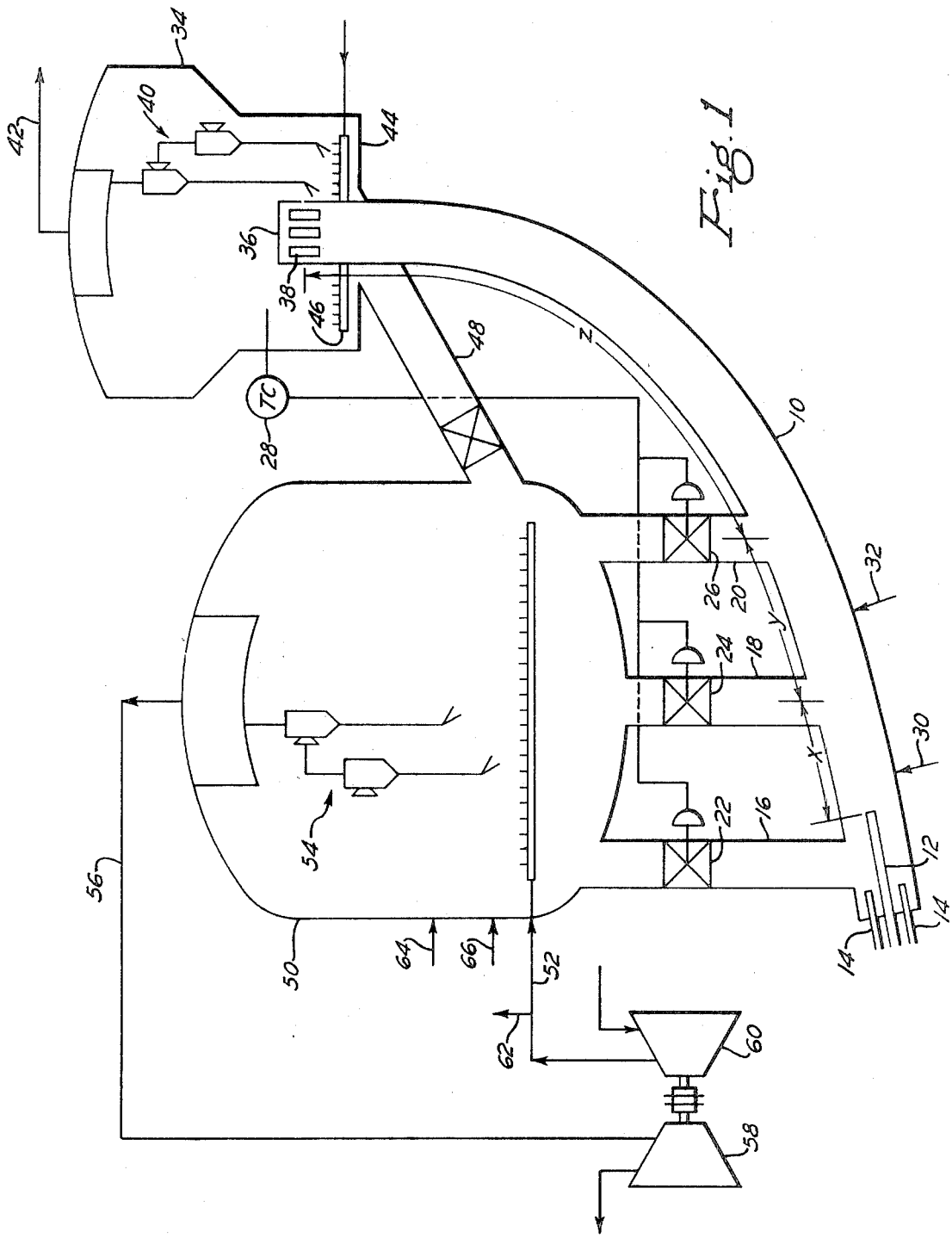

United States Patent

Carr et al.

[15] 3,639,228
[45] Feb. 1, 1972

[54] FCC PROCESS UTILIZING DIVIDED CATALYST INJECTION

[72] Inventors: Norman L. Carr, Allison Park; John A. Paraskos, Pittsburgh; Daniel Y. Ko, Monroeville, all of Pa.

[73] Assignee: Gulf Research & Development Company, Pittsburgh, Pa.

[22] Filed: Oct. 28, 1969

[21] Appl. No.: 870,046

[52] U.S. Cl. ..........................208/153, 23/288 S, 208/75, 208/120, 208/155
[51] Int. Cl. ..............C01b 33/28, C10g 11/18, C10g 11/20
[58] Field of Search..................208/163, 75, 120, 153, 155; 23/288 S

[56] References Cited

UNITED STATES PATENTS

| | | | |
|---|---|---|---|
| 2,956,003 | 10/1960 | Marshall et al. | 208/74 |
| 3,186,805 | 6/1965 | Gomory | 208/153 X |
| 3,355,380 | 11/1967 | Luckenbach | 208/153 |
| 3,392,110 | 7/1968 | Payne | 208/120 |
| 3,393,145 | 7/1968 | Dill et al. | 208/59 |
| 3,440,020 | 4/1969 | Owen | 208/153 X |

Primary Examiner—Delbert E. Gantz
Attorney—Meyer Neishloss, Deane E. Keith and Alvin E. Ring

[57] ABSTRACT

A fluid catalytic cracking system in which hydrocarbon feed and a zeolite catalyst or a catalyst of comparable activity and/or selectivity to gasoline is charged to a reactor having a short residence time is improved by charging only a portion of the fresh or freshly regenerated catalyst which is used to the inlet of the reactor together with the hydrocarbon feed and charging the remainder of the freshly regenerated catalyst substantially without hydrocarbon feed downstream in the reactor. This arrangement results in a higher gasoline yield and a higher selectivity to gasoline in the reactor.

6 Claims, 4 Drawing Figures

100 PER CENT OF CATALYST ADDED AT INLET.

BENEFITS OF 50-50 CATALYST SPLIT AS COMPARED TO FIGURE 2:

INCREASED GASOLINE SELECTIVITY - 3.2 PER CENT.
INCREASED GASOLINE YIELD - 1.6 PER CENT.

BENEFITS OF 40-60 CATALYST SPLIT AS COMPARED TO FIGURE 3:

INCREASED GASOLINE SELECTIVITY - 3.4 PER CENT.
INCREASED GASOLINE YIELD - 1 PER CENT

INVENTORS.
NORMAN L. CARR
DANIEL Y. KO
JOHN A. PARASKOS

FCC PROCESS UTILIZING DIVIDED CATALYST INJECTION

This invention relates to the cracking of a petroleum hydrocarbon feed stock to gasoline in the presence of a highly active fluid cracking catalyst such as a crystalline aluminosilicate zeolite or a catalyst of comparable activity, or selectivity, or both.

Natural or synthetic zeolite aluminosilicate cracking catalysts exhibit high activity in the cracking of hydrocarbon oils both in terms of total conversion to gasoline and in terms of selectivity to gasoline. The present invention relates to a method for improving the selectivity to gasoline production from higher boiling hydrocarbons in cracking processes utilizing a fluidized zeolitic cracking catalyst or a catalyst of comparable activity and/or selectivity.

It was previously known that in a fluid catalytic cracking process the activity of the catalyst decays with time in the reaction environment. Coke laydown is principally responsible for activity decay. This activity decay reduces the effectiveness of the catalyst by reducing the rate of cracking reactions, such as gas oil conversion to gasoline and light hydrocarbon gases. Furthermore, it is well known that zeolite catalysts have both higher activity and selectivity than previously used catalysts. This has resulted in the use of short-time reactors which are usually referred to as "transfer line" or "riser" reactors. The established way of operating this reactor is to contact both the flowing hot catalyst and the hot oil at the inlet of a reactor, carry out the reaction in a short-time reaction zone, and then disengage the catalyst from the reacted mixture.

We have now discovered a new concept for the catalytic cracking of gas oils in a transfer line reactor. The new concept involves the addition of fresh or freshly regenerated, highly active, cracking catalyst in one or more catalyst injection points along the length of the transfer line, as well as at the reactor entrance. The primary purpose of multiple catalyst injection is to increase the yield and selectivity of the cracking reaction to gasoline. The improvement is found by comparing two systems wherein are used the same oil feed rate, the same total catalyst flow rate at a given initial temperature, the same oil inlet temperature, and the same reactor size, differing in the mode of catalyst injection.

A multiple catalyst injection apparatus of this invention, in addition to providing means for accomplishing the superior degree of gasoline yield and selectivity described below, provides other advantages in fluid catalytic cracking operations. For example, reduced equipment erosion is realized by splitting the total catalyst flow into a plurality of streams and by dropping the streams of regenerated catalyst vertically directly into flowing fluid streams so that no flow directional change occurs in the most dense and therefore most erosive regenerated catalyst stream until said stream is diluted by flowing fluid in the reactor riser.

Another advantage of the apparatus of the present invention is that it shifts a major portion of the cracking reaction away from the inlet end of the reactor and thereby tends to distribute the cracking reaction over the length of the riser rather than to concentrate it at the beginning of the riser. If all the catalyst were added to the inlet end of the reactor with the hydrocarbon feed, almost all the cracking would occur in a small fraction of the riser length near the inlet end and nearly all the remaining riser length would merely afford an opportunity for the gasoline produced at the beginning of the reactor to aftercrack. However, by adding a portion of the total required catalyst later in the reactor, the production of a portion of the total gasoline yield is delayed and shifted closer to the reactor discharge end and this portion of the total gasoline yield therefore has only a diminished opportunity to aftercrack because its residence time in the reactor is not as great as it would be if it were produced at the beginning of the reactor. Clearly the apparatus of the present invention which is claimed in cofiled application Ser. No. 870,045 permits an improved distribution of the total reaction in the riser so that there is a reduced opportunity for gasoline produced to aftercrack before leaving the reactor.

In accordance with the present invention a method is presented for increasing the yield of gasoline in the cracking process and also increasing the selectivity to gasoline. This method is based upon the discovery that the catalyst activity in the cracking operation decays according to the following equation:

$$d\alpha/dx = -ky\alpha$$

where $\alpha$ is the instantaneous catalyst activity, $x$ is the fractional length of the reaction zone, $k$ is a parameter of the catalyst depending on temperature and $y$ is the local concentration of the feed hydrocarbon oil to be cracked. This equation indicates that the greatest rate of decay of activity as the catalyst moves along the reactor length occurs when the concentration of the uncracked hydrocarbon feed is the highest and the rate of decay declines as the concentration of the uncracked hydrocarbon feed diminishes.

In accordance with the present invention the effectiveness of catalyst utilization is increased with respect to gasoline yield and selectivity by diversifying the positions in the reactor of charging catalyst and hydrocarbon feed so that for any desired ratio of catalyst to hydrocarbon feed in the overall reactor system the entire quantity of catalyst and hydrocarbon feed are not together added to the reactor or are not separately added to about the same position or positions in the reactor as occurs in the prior art but at least a portion of the catalyst required to constitute the desired ratio is added relatively downstream in the reactor from the position of entry of the earliest charged catalyst and the hydrocarbon feed to be cracked to gasoline. According to the present invention, provision is made to increase progressively the ratio of fresh or newly regenerated catalyst to unreacted hydrocarbon to be cracked to gasoline one or more times during flow of the reaction stream through the reactor. Preferably, only a portion of the total freshly regenerated catalyst charge to the reactor is added to the bottom of the reactor with the hydrocarbon feed while the remaining portion of the total catalyst charge is added downstream in the reactor without hydrocarbon feed. In accordance with the present invention, the greatest improvement in gasoline yield and selectivity is achieved when a greater quantity of catalyst is added without hydrocarbon at the downstream position than is added with the hydrocarbon feed at the reactor inlet.

In practising this invention, a fluid catalytic cracking riser can pass beneath a catalyst regenerating chamber which has at least two standpipes extending between the regenerator and the riser. A portion of the regenerated catalyst used passes through the first standpipe to contact fresh gas oil charge. Control of regenerated catalyst temperature, gas oil charge rate, regenerated catalyst carbon level, and available contact time permits the utilization of high temperature (i.e., 1,000° F.)—high activity cracking to obtain highly selective cracking at a high rate. For example, this charge can be cracked in less than 0.5 seconds to obtain 50–60 percent conversion and 40–45 percent gasoline yield. Then, further down the transfer line, the addition of fresh active catalyst through a second standpipe extending between the regenerator and the riser can produce similarly selective cracking on the remaining unconverted gas oil charge. If comparative tests are performed with a constant total amount of catalyst on each test, it will be found that dual catalyst injection will produce the same or greater conversion than that obtained with single conventional catalyst injection (i.e., about 80–85 percent by volume), but even at the same conversion, more selective product distributions (i.e., perhaps 70 + percent volume of gasoline directly from the riser) and a contact time less than that required with conventional single catalyst injection can be realized.

The benefits of multiple catalyst addition along the length of the transfer line in accordance with the present invention can be demonstrated with reference to a mathematical simulation which recognizes the following reactions occurring in a cracking riser.

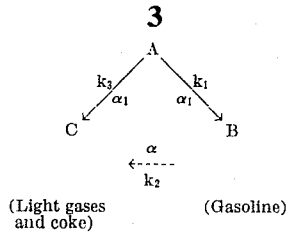

(Light gases and coke)   (Gasoline)

In the above diagram, the $k$'s represent catalytic temperature dependent reaction rate parameters, while the $\alpha$'s are relative catalyst activities for the reacting species. The present invention for the first time both recognizes and makes use of the fact that the decay in catalyst activity, for this particular reaction mechanism, due to cracking of gas oil to either gasoline or to light gases and coke is not the same as the decay in catalyst activity due to cracking of gasoline to light gases and coke, otherwise known as "aftercracking." Reaction simulations are presented below in which a run wherein the total catalyst is introduced to the beginning of the reactor together within the total gas oil charge is compared with runs wherein both one-half and more than one-half of the total catalyst is introduced at a point located 0.44 of the total reactor length from the entrance, the remaining portion of the catalyst being injected at the catalyst entrance together with the total gas oil charge. Thus at the second catalyst injection point a step change in catalyst flow rate, catalyst activity and catalyst temperature is initiated. In the simulation, the new values of activity and temperature were considered to be the average of the point values of the aged and the freshly injected catalyst while the catalyst flow rate was doubled or more than doubled, depending upon the test. The simulation shows that with multiple catalyst injection an increase in gasoline yield and an increase in gasoline selectivity is realized.

The primary reason for the increased yield and selectivity rests with the nature of the catalyst activity. In the simulation of the process, as stated above, the rate of catalyst deactivation, referenced to gas oil, is proportional to the local unreacted hydrocarbon feed concentration and the local catalyst activity, as follows:

$$d\alpha_1/dx = -ky\alpha_1$$

Thus, catalyst added at a point in the reactor where the local unreacted hydrocarbon feed concentration is low decays at a lower rate than that injected at the reactor entrance.

Although zeolitic aluminosilicates are especially useful catalysts for purposes of the present invention, any silica alumina or other cracking catalyst which is sufficiently active and/or selective to be capable of producing at least a transient maximum or peak gasoline yield from the total fresh hydrocarbon feed capable of being cracked to gasoline at residence times of about 5 seconds or less are within the purview of this invention. The maximum gasoline yield obtained at residence times within 5 seconds is generally transient and rapidly diminishes. After a residence time of 1 second, for any given hydrocarbon and catalyst charge most of the fresh hydrocarbon feed is converted and there is a sharp drop in rate of conversion of fresh feed. However, if the hydrocarbon continues to remain in contact with the catalyst, products of the earlier cracking operation themselves in turn undergo cracking. This occurrence is termed "aftercracking." Since there is a greater abundance of cracked material than uncracked material after only about one-half to 1 second of reaction zone residence time or less for a given hydrocarbon feed and catalyst charge the situation rapidly arises wherein considerably more cracking of cracked than uncracked material can occur. When this situation prevails, the desired gasoline product initially produced at a high selectivity in accordance with the present invention becomes depleted due to aftercracking at a faster rate than it is replenished due to cracking of remaining uncracked feed so that the selectivity advantage initially achieved is subsequently lost at a significant rate. If timely disengagement of hydrocarbon and catalyst does not occur prior to the occurrence of a significant amount of aftercracking the very existence of the earlier advantageous selectivity effect can be entirely masked. This invention requires substantially instantaneous disengagement of catalyst and hydrocarbon as these materials exit from the reaction zone into a disengaging vessel and requires that the fluid charge rate to the system and the reactor length should be established to provide a residence time such that the gasoline conversion and selectivity advantage due to multiple catalyst injection is not lost due to aftercracking.

In accordance with this invention, the reactor is operated so that there is a continual increase in gasoline throughout substantially the entire length of the reactor coupled with a decrease in fresh feed, which means that the reaction is terminated at or near the time of maximum gasoline yield. At least there is no significant loss of total gasoline yield throughout the length of the reactor. There is a substantial absence of backmixing in the reactor since this would be conducive to aftercracking. Backmixing can be caused by excessive linear velocity which gives rise to turbulence or by the formation of a dense catalyst bed which induces turbulence in flowing vapors. The hydrocarbon remains in the reactor only until a decrease in fresh feed content is not accompanied by any substantial further net increase in gasoline. Maximum gasoline yield is generally accompanied by maximum gasoline selectivity.

The overall time of contact between hydrocarbon and catalyst can be as low as about 0.5 second or less but not substantially greater than about 5 or 6 seconds and will depend upon many variables in a particular process such as the boiling range of the charge, the particular catalyst, the amount of carbon on the regenerated catalyst, the catalyst activity, the reaction zone temperature, the polynuclear aromatic content of the hydrocarbon feed, etc. Some of these variables can affect one another. For example, if the fresh hydrocarbon charge includes a considerable quantity of polynuclear aromatics, the reaction should be permitted to proceed long enough to crack any mono- or di-aromatics or naphthenes because these compounds produce relatively high gasoline yields and are the most readily crackable aromatics but the reaction should be terminated before significant cracking of other polynuclear aromatics occurs because cracking of these latter compounds occurs at a slower rate and results in excessive deposition of carbon on the catalyst. It is clear, that no fixed cracking time duration can be set forth but the time will have to be chosen within the range of this invention depending upon the particular system. In one system, slightly exceeding a 1.0 second residence time might result in such severe aftercracking that the selectivity advantage would be lost while in another system unless a 1.0 second residence time is appreciably exceeded there might not be sufficient cracking of charge hydrocarbon to render the process economic.

The reaction temperature in accordance with this invention is at least about 900° F. The upper limit can be about 1,100° F., or more. The preferred temperature range is 950° to 1,050° F. Each catalyst injection will result in a step up in reactor temperature within the range of this invention. The reaction total pressure can vary widely and can be, for example, 5 to 50 p.s.i.g., or preferably, 20 to 30 p.s.i.g. The maximum residence time is 5 or 6 seconds, and for most charge stocks the residence time will be about 1.5 to 4 seconds. For high molecular weight charge stocks which are rich in polynuclear aromatics a 0.5 to 1.5 second residence time could be suitable in order to crack mono- and di-aromatics and naphthenes which are the aromatics which crack most easily and which produce the highest gasoline yield, but to terminate the operation before appreciable cracking of polyaromatics occurs because these materials produce high yields of coke and $C_2$ and lighter gases. The length to diameter ratio of the reactor can vary widely, but the reactor should be elongated to provide a high linear velocity, such as about 25 to 75 feet per second, and to this end a length to diameter ratio above about 20 or 25 is suitable. The reactor can have a uniform diameter or can be provided with a continuous taper or a stepwise increase in diameter along the reaction path to maintain a nearly constant velocity along the flow path. A vapor diluent is generally added with the hydrocarbon feed. The amount of diluent can vary. If steam is the diluent employed, a typical amount to be charged can be about 10 percent by volume, which is about 1 percent by weight, based on hydrocarbon charge. A suitable but nonlimiting proportion of diluent gas, such as steam or nitrogen, to fresh hydrocarbon feed can be 0.5 to 10 percent by weight.

A zeolite catalyst is a highly suitable catalytic material in accordance with this invention. A mixture of natural and synthetic zeolites can be employed. Also a mixture of crystalline zeolite aluminosilicates with nonzeolitic amorphous silica aluminas is suitable as a catalytic entity. Any catalyst containing zeolitic material or otherwise which provides a transient maximum gasoline yield within a 5 or 6 second residence time is suitable. The catalyst particle size must render it capable of fluidization as a dispersed phase in the reactor. Typical and nonlimiting fluid catalyst particle size characteristics are as follows:

| Size (Microns) | 0-20 | 20-45 | 45-75 | >75 |
|---|---|---|---|---|
| Weight, percent | 0-5 | 20-30 | 35-55 | 20-40 |

These particle sizes are usual and are not peculiar to this invention. A suitable overall weight ratio of catalyst to total oil charge for the entire reactor system is about 4:1 to about 12:1 or 15:1 or even 25:1, generally, or 6:1 to 10:1, preferably. The fresh hydrocarbon feed is generally preheated to a temperature of about 600° to 700° F. but is generally not vaporized during preheat, and the additional heat required to achieve the desired reactor temperature is imparted by hot, regenerated catalyst.

The weight ratio of catalyst to hydrocarbon in the feed is varied to affect variations in reactor temperature. Furthermore, the higher the temperature of the regenerated catalyst the less catalyst is required to achieve a given reaction temperature. Therefore, a high regenerated catalyst temperature will permit the very low riser fluid density set forth below and thereby help to avoid backmixing in the reactor. Generally, catalyst regeneration can occur at an elevated temperature of about 1,240° or 1,250° F. or more to reduce the level of carbon on the regenerated catalyst from about 0.6 to 1.5 to about 0.05 to 0.3 percent by weight. At usual total catalyst to oil ratios in the feed, the quantity of catalyst is more than ample to achieve the desired catalytic effect and therefore if the temperature of the catalyst is high, the ratio can be safely decreased without impairing conversion. Since zeolitic catalysts are particularly sensitive to the carbon level on the catalyst, regeneration advantageously occurs at elevated temperatures in order to lower the carbon on the catalyst to the stated range or lower. Moreover, since a prime function of the catalyst is to contribute heat to the reactor, for any given desired reactor temperature the higher the temperature of the catalyst charge the less catalyst is required. The lower the catalyst charge rate the lower the density of the material in the reactor. As stated, low reactor densities help to avoid backmixing.

The reactor linear velocity, while not being so high that it induces turbulence and excessive backmixing, must be sufficiently high that substantially no catalyst accumulation or buildup occurs in the reactor because such accumulation itself leads to backmixing. Therefore, catalyst and hydrocarbon at any linear position along the reaction path both flow concurrently at about the same linear velocity, thereby avoiding significant slippage of catalyst relative to hydrocarbon. A buildup of catalyst in the reactor leads to a dense bed and backmixing which in turn increases the residence time in the reactor for at least a portion of the charge hydrocarbon and induces aftercracking. Avoiding a catalyst buildup in the reactor results in a very low catalyst inventory in the reactor, which in turn results in a high space velocity. Therefore, a space velocity of over 100 or 120 weight of hydrocarbon per hour per weight of catalyst inventory is highly desirable. The space velocity should preferably not be below 35 and can be as high as 500. Due to the low catalyst inventory and low charge ratio of catalyst to hydrocarbon, the density of the material at the inlet of the reactor can be only about 1 to less than 5 pounds per cubic foot, although these ranges are nonlimiting. An inlet density below 4 or 4.5 pounds per cubic foot is desirable since this density range is too low to encompass dense bed systems which induce backmixing. Although, conversion falls off with a decrease in inlet density to very low levels, we have found the extent of aftercracking to be a more limiting feature than total conversion of fresh feed, even at an inlet density of less than 4 pounds per cubic foot. As the reactor fluid approaches the outlet of the reactor the density tends to be diminished because the cracking operation produces about a fourfold increase in mols of hydrocarbon. The decrease in density in approaching the reactor outlet can be a measure of conversion.

A wide variety of hydrocarbon oil charge stocks can be employed. A suitable charge is a gas oil boiling in the range of 430° to 1,100° F. As much as 5 to 20 percent of the fresh charge can boil above this range. Some residual oil can be charged. A 0 to 5 percent recycle rate can be employed. Generally, the recycle will comprise 650° F. + oil from the product distillation zone which contains catalyst slurry. If there is no catalyst entrainment, recycle can be omitted.

A suitable reactor-regenerator system for performing this invention is described in reference to FIG. 1. The cracking occurs with a fluidized zeolitic catalyst in an elongated reactor tube 10, which is referred to as a riser. The riser preferably has a length to diameter ratio of above 20 or above 25. A full range hydrocarbon oil feed to be cracked is preheated to about 600° F., or above, and is then charged into the inlet end of riser 10 through inlet line 12. Steam is introduced into riser 10 through lines 14 to help fluidize regenerated catalyst which flows to the bottom of the riser through vertical transfer line 16.

The oil charge to be cracked in the riser is a gas oil having a boiling range of about 430° to 1,100° F. The steam added to the riser can amount to about 10 weight percent based on oil charge, but the amount of steam can vary widely. The catalyst employed is a fluidized zeolitic aluminosilicate and is added to various positions in the riser through vertical standpipes 16, 18 and 20. Although, standpipes 16, 18 and 20 are vertical along their entire length, riser 10 is inclined and somewhat curved in the region it receives the standpipes and downstream from said region. The riser temperature is between about 900° and 1,100° F. and is controlled by measuring the temperature of the product effluent from the riser as well as other process variables and controlling the opening of valves 22, 24, and 26 in standpipes 16, 18 and 20, respectively, in response to said measurements by means of a process control computer, or in the simplest case, the temperature controller 28. The openings of control valves 22, 24 and 26 are adjusted to regulate the inflow of regenerated catalyst to various positions in riser 10. The temperature of the regenerated catalyst is above the control temperature in the riser so that the incoming catalyst contributes heat to the cracking reaction. The riser pressure is between about 10 and 35 p.s.i.g. If desired, an inert gaseous material to assist mixing of catalyst and reaction fluid can be added to the riser through lines 30 or 32. Also, if desired, lines 30 and 32 can be omitted so that the entire inert gaseous feed as well as the entire hydrocarbon feed to the riser enters through lines 12 and 14. The residence time of both hydrocarbon and catalyst is very small and is from 0.5 to 5 seconds. The velocity throughout the riser is about 35 to 55 feet per second and is sufficiently high so that there is little or no slippage between the hydrocarbon and the catalyst flowing through the riser. Therefore, no bed of catalyst is permitted to build up within the riser, whereby the density within the riser is very low. The density within the riser can be a maximum of about 4 pounds per cubic foot at a zone of catalyst addition and can decrease to about 2 pounds per cubic feet at the top of the riser. Since no dense bed of catalyst is permitted to build up within the riser the space velocity through the riser is unusually high and will range between about 100 or 120 and 600 weight of hydrocarbon per hour per instantaneous weight of catalyst in the reactor. No significant catalyst build up within the reactor is permitted to occur and the overall catalyst to oil weight ratio is between about 4:1 and 15:1.

The hydrocarbon and catalyst exiting from the top of the riser is passed into a disengaging vessel 34. The top of the riser is capped at 36 so that discharge occurs through lateral slots 38 for proper dispersion. An instantaneous separation between hydrocarbon and catalyst occurs in the disengaging vessel. The hydrocarbon which separates from the catalyst is primarily gasoline together with some heavier components and some lighter gaseous components. The hydrocarbon effluent passes through cyclone system 40 to remove catalyst and is then discharged to a fractionator through line 42. The catalyst separated from hydrocarbon in disengager 34 immediately drops below the outlets 38 of the riser so that there is no catalyst level in the disengager but only a lower stripper section 44. Steam is introduced into catalyst stripper section 44 through sparger 46 to remove any entrained hydrocarbon in the catalyst.

Catalyst leaving disengager 34 passes through transfer line 48 to regenerator 50. The catalyst contains carbon deposits which tend to lower its cracking activity and selectivity and as much carbon as possible should be burned from the surface of the catalyst. This burning is accomplished by introduction to the regenerator through line 52 of approximately the stoichiometrically required amount of air for combustion of the carbon deposits. The catalyst from the stripper enters the bottom section of the regenerator in a radial and downward direction through transfer line 48. Flue gas leaving the dense catalyst bed in regenerator 50 flows through cyclones 54 wherein catalyst fines are separated from flue gas permitting the flue gas to leave the regenerator through line 56 and pass through turbine 58 before leaving for a waste heat boiler wherein any carbon monoxide contained in the flue gas is burned to carbon dioxide to accomplish heat recovery. Turbine 58 compresses atmospheric air in air compressor 60 and this air is charged to the bottom of the regenerator through line 52.

The temperature throughout the dense catalyst bed in the regenerator is about 1,250° F. The temperature of the flue gas leaving the top of the catalyst bed in the regenerator can rise due to afterburning of carbon monoxide to carbon dioxide. Approximately a stoichiometric amount of oxygen is charged to the regenerator and the reason for this is to minimize afterburning of carbon monoxide to carbon dioxide above the catalyst bed to avoid damage to the equipment and the catalyst. In order to prevent excessively high temperatures in the regenerator flue gas due to afterburning, the temperature of the regenerator flue gas is controlled by measuring the temperature of the flue gas entering the cyclones and then some of the pressurized air otherwise destined to be charged to the bottom of the regenerator through line 52 is discharged to the atmosphere through line 62 in response to this measurement. The regenerator reduces the carbon content of the catalyst from 1 to 0.5 weight percent to 0.2 weight percent or less. If desired, steam is available through line 64 for cooling the regenerator. Makeup catalyst is added to the bottom of the regenerator through line 66. Regenerator catalyst passes from the bottom of the regenerator to various positions in riser 10 through vertical standpipes 16, 18 and 20.

EXAMPLES

Simulated tests were made to illustrate the advantage of this invention. The tests were based upon cracking a gas oil charge in an upflow riser with a zeolite fluid cracking catalyst with no catalyst accumulation in the riser. The reaction conditions of all tests include a riser temperature of 950° F., a reactor pressure of 30 p.s.i.g., a total catalyst flow rate of 13.3 pounds per hour, a fluid flow rate (including gas oil and inerts) of 1.792 pounds per hour, a contact time of 3 to 4 seconds and a weight fraction of reactant in the feed of 0.96 pounds of gas oil feed per pound of total fluid feed.

The tests differ only in the manner of admission of catalyst to the riser. In the base test (FIG. 2) the total catalyst is admitted to the bottom of the riser together with the total fluid feed. In the first simulated comparative test of this invention (FIG. 3), one-half of the total catalyst charge, that is one-half of 13.3 pounds per hour of catalyst, is charged to the bottom of the riser together with the total fluid feed while the other half is charged to the riser at a point therein 44 percent of the total riser length from the inlet.

Figures 2, 3, 4:
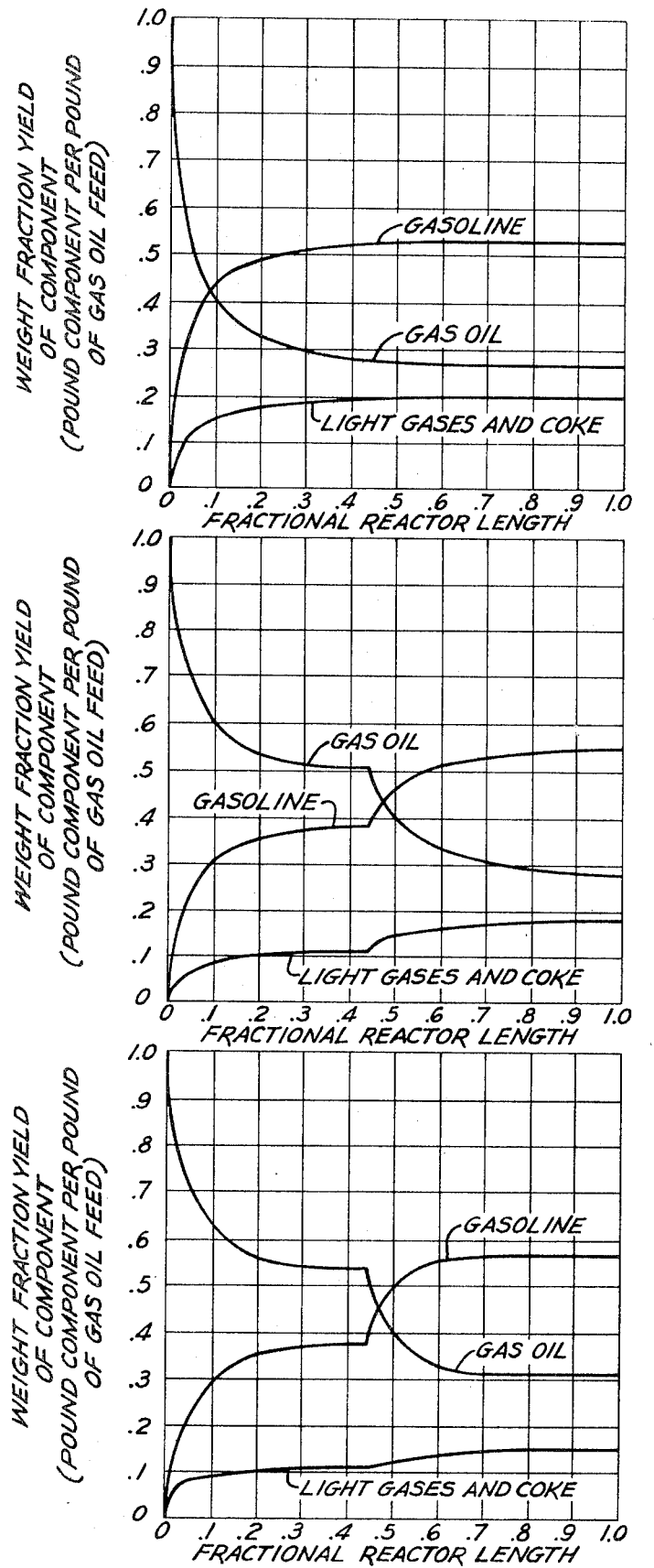

The results with the base case in which the total catalyst is charged to the bottom of the riser are illustrated in FIG. 2 while the results that can be obtained when one-half of the catalyst is charged upstream from the bottom of the riser are illustrated in FIG. 3. The results for the base case (FIG. 2) include a yield of 52.8 pounds of gasoline per 100 pounds of gas oil feed, 27.0 pounds of gas oil (unconverted feed) remaining in the reactor effluent per 100 pounds of gas oil in the feed and 20.2 pounds of light gases and coke per 100 pounds of gas oil feed indicating a gasoline selectivity of 72.3 percent. Results which can be obtained for the 50–50 catalyst test of this invention (FIG. 3) include a gasoline yield of 54.4 pounds of gasoline per 100 pounds of gas oil feed, 27.9 pounds of gas oil (unconverted feed) remaining of the effluent per 100 pounds of gas oil in the feed, 17.7 pounds of light gases and coke per 100 pounds of gas oil feed, indicating a gasoline selectivity of 75.5 percent.

The above two comparative tests show an increase in gasoline selectivity (pounds of gasoline product per 100 pounds of gas oil feed) of 3.2 percent and an increase in yield to gasoline of 1.6 pounds per 100 pounds of gas oil feed.

In a further simulated test (FIG. 4), 40 percent of the catalyst or 5.33 pounds per hour together with the total hydrocarbon feed is added to the inlet of the riser and 60 percent of the catalyst or 7.99 pounds per hour is added to the riser at a point therein 44 percent of the total riser length from the inlet. In this test 55.4 pounds of gasoline are produced per 100 pounds of gas oil feed, 29.9 pounds of gas oil (unconverted feed) remain in the effluent per 100 pounds of gas oil feed, 14.7 pounds of light gases and coke are produced per 100 pounds of gas oil feed, indicating a gasoline selectivity of 78.9 percent.

The 40–60 test of FIG. 4 shows an increase in gasoline selectivity of 3.4 percent and an increase in yield of gasoline of 1 pound per 100 pounds of gas oil feed over the 50–50 test of FIG. 3.

For any particular overall catalyst to oil ratio supplied to a cracking riser, the advantage obtained by dividing the total catalyst charge depends upon the relative quantity of catalyst introduced at each catalyst entry point and the positions in the reactor at which downstream catalyst injection occurs. For example, the above examples show that when a greater amount of catalyst is added downstream than is added at the inlet, gasoline production and gasoline selectivity improves as compared to the introduction of equal amounts of catalysts at the same downstream and inlet locations. Also, the location of the downstream injection point is highly important. If the downstream injection point is too close to the inlet injection point, the two points effectively merge, resulting in essentially a single injection point. Observation of FIGS. 3 and 4 show that downstream catalyst injection does not occur until gasoline production resulting from the previous catalyst injection has substantially leveled off. Once the leveling off of gasoline production due to previous catalyst injection has occurred, reaction space is essentially being wasted until a subsequent catalyst injection occurs. This is especially true where there is a 50–50 catalyst split since, as shown in FIG. 3, the rate of gasoline production resulting from the subsequent catalyst injection is slower than from the initial catalyst injection so that the second catalyst injection should occur sufficiently remote from the riser exit to permit the gasoline production curve resulting therefrom to become substantially level in advance of the riser exit. When equal quantities of catalyst are added at each injection, progressively longer lengths of riser following each injection should be available prior to a subsequent injection or prior to the riser terminus. Progressively longer riser lengths are equivalent to progressively longer residence times. In summation, the ratio of inlet to downstream catalyst charge and the locale of the downstream catalyst injection should be selected so that there is a greater gasoline production and/or gasoline selectivity in the riser than there would be if the same total amount of catalyst were added to the inlet of the riser with the hydrocarbon feed.

In view of the above, it will be appreciated that in FIG. 1 the relative spacing of catalyst standpipes 16, 18 and 20 is schematic only and standpipes 18 and 20 should be spaced from each other and in relation to standpipes 16 in accordance with the above considerations. Therefore, in recognition of the slower rate of gasoline production from downstream catalyst injections with equally divided catalyst streams, standpipes 18 and 20 should be further apart than standpipes 16 and 18 so that the distances represented by riser lengths $x$, $y$ and $z$ of FIG. 1 are of progressively increasing length. Furthermore, in FIG. 1 valves 24 and 26 should be capable of permanent manual closure, disregarding temperature control, in the event that either of their respective standpipes introduces catalyst to the riser before gasoline production from the previous catalyst injection point has not substantially leveled off. Therefore, if gasoline production from standpipe 16 catalyst has not leveled off at standpipe 18, valve 24 can be permanently closed. Similarly, if gasoline production from standpipe 18 injection has not leveled off at standpipe 20, valve 26 can be permanently closed.

We claim:

1. In a process for cracking a gas oil hydrocarbon feed to gasoline in the presence of a fluid zeolite catalyst by passing said feed and catalyst through a riser at a temperature between 900° and 1,100° F. and a residence time of less than 6 seconds at a velocity sufficiently high that catalyst and hydrocarbon flow concurrently through the process substantially avoiding catalyst accumulation and bed formation in the reaction flow stream and catalyst is separated from a hydrocarbon product stream containing both gasoline and unreacted gas oil at the exit of said riser, the improvement comprising splitting the introduction of the total catalyst by introducing substantially the entire gas oil feed and a freshly regenerated first portion of the zeolite catalyst at an upstream position in the riser to convert a first portion of said gas oil feed and produce a first portion of the total gasoline product, introducing a freshly regenerated second portion of the zeolite catalyst at a relatively downstream position in the riser at which production of said first portion of gasoline product has substantially leveled off to convert a second portion of said gas oil feed and produce a second portion of the total gasoline product, the ratio of said second to said first portion of zeolite catalyst being sufficiently great to result in a smaller total conversion of the gas oil feed but a higher total gasoline yield as compared to introduction of the entire catalyst in the same total amount at said upstream position in the riser.

2. The process of claim 1 wherein the quantity of said second portion of catalyst is greater than the quantity of said first portion of catalyst.

3. The process of claim 1 wherein the quantity of said second portion of catalyst is about equal to the quantity of said first portion of catalyst.

4. The process of claim 1 wherein said second portion of catalyst is introduced at a plurality of downstream positions in the riser.

5. In a process for cracking a gas oil hydrocarbon feed to gasoline in the presence of a fluid zeolite catalyst by passing said feed and catalyst through a riser at a temperature between 900° and 1,100° F. and a residence time of less than 6 seconds at a velocity sufficiently high that catalyst and hydrocarbon flow concurrently through the process substantially avoiding catalyst accumulation and bed formation in the reaction flow stream and catalyst is separated from a hydrocarbon product stream containing both gasoline and unreacted gas oil at the exit of said riser, the improvement comprising splitting the introduction of the total catalyst by introducing substantially the entire gas oil feed and a freshly regenerated first portion of the zeolite catalyst at an upstream position in the riser to convert a first portion of said gas oil feed and produce a first portion of the total gasoline product, introducing a freshly regenerated second portion of the zeolite catalyst at a relatively downstream position in the riser at which production of said first portion of gasoline product has substantially leveled off to convert a second portion of said gas oil feed and produce a second portion of the total gasoline product, said second portion of catalyst being equal to or greater than said first portion of catalyst by an amount which results in a smaller total conversion of the gas oil feed but a higher total gasoline yield as compared to introduction of the entire catalyst in the same total amount at said upstream position in the riser.

6. The process of claim 5 wherein said second portion of catalyst is introduced at a plurality of downstream positions in the riser.

* * * * *